(12) United States Patent
Lang et al.

(10) Patent No.: US 10,745,027 B2
(45) Date of Patent: Aug. 18, 2020

(54) VIEWING SYSTEM WITH FIELD OF VISION SUPERIMPOSITION DEPENDING ON THE DRIVING SITUATION

(71) Applicant: MEKRA LANG GMBH & CO. KG, Ergersheim (DE)

(72) Inventors: Werner Jürgen Lang, Ergersheim (DE); Christian Rebelein, Petersaurach (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 32 days.

(21) Appl. No.: 16/038,972

(22) Filed: Jul. 18, 2018

(65) Prior Publication Data

US 2019/0031206 A1 Jan. 31, 2019

(30) Foreign Application Priority Data

Jul. 31, 2017 (DE) .......................... 10 2017 117 287

(51) Int. Cl.
| | |
|---|---|
| *B60W 50/14* | (2020.01) |
| *B60R 1/00* | (2006.01) |
| *B60W 30/095* | (2012.01) |
| *G06K 9/00* | (2006.01) |

(52) U.S. Cl.
CPC ............. *B60W 50/14* (2013.01); *B60R 1/00* (2013.01); *B60W 30/0956* (2013.01); *G06K 9/00805* (2013.01); *B60R 2300/301* (2013.01); *B60R 2300/304* (2013.01); *B60R 2300/306* (2013.01);

(Continued)

(58) Field of Classification Search
CPC ............. B60W 50/14; B60W 30/0956; B60W 2050/146; B60R 1/00; B60R 2300/8093; B60R 2300/301; B60R 2300/304; B60R 2300/306; G06K 9/00805
See application file for complete search history.

(56) References Cited

U.S. PATENT DOCUMENTS

| | | | |
|---|---|---|---|
| 2011/0025489 A1 | 2/2011 | Shimoda et al. | |
| 2012/0179330 A1* | 7/2012 | Normand ............... | B60K 35/00 701/36 |

(Continued)

FOREIGN PATENT DOCUMENTS

| | | |
|---|---|---|
| DE | 10 2009 045 233 | 4/2011 |
| DE | 10 2012 007 984 | 3/2013 |
| DE | 10 2013 003 806 | 9/2014 |

(Continued)

*Primary Examiner* — Sisay Yacob
(74) *Attorney, Agent, or Firm* — Cozen O'Connor

(57) ABSTRACT

A viewing system (100) for a vehicle (10, 10A, 10B, 10C) having at least one capture unit (20A, 20B) adapted to capture at least one first near area (1, 2, 3, 4) around the vehicle (10, 10A, 10B, 10C), at least one control unit (30) adapted to process the data captured by the capture unit (20A, 20B) and at least one reproduction unit (40A, 40B) adapted to show the near area (1, 2, 3, 4) visibly for a driver which steers the vehicle (10, 10A, 10B, 10C). During driving maneuvers conditioned by the situation, in addition, at least one collision area (K1, K2) which comprises an area at risk of collision around the vehicle (10, 10A, 10B, 10C) is shown on the reproduction unit (40A, 40B). The collision area (K1, K2) corresponds to an image section of a near area (1, 2, 3, 4) captured by the capture unit around the vehicle (10, 10A, 10B, 10C).

19 Claims, 8 Drawing Sheets

(52) U.S. Cl.
CPC ............ *B60R 2300/8093* (2013.01); *B60W 2050/146* (2013.01)

(56) References Cited

U.S. PATENT DOCUMENTS

2016/0375829 A1* 12/2016 Lang .................. H04N 5/23293
　　　　　　　　　　　　　　　　　　　348/148
2017/0129405 A1　　5/2017 Oba

FOREIGN PATENT DOCUMENTS

| DE | 10 2013 020 950 | 6/2015 |
| DE | 10 2015 001 359 | 8/2015 |
| DE | 10 2015 008 042 | 12/2016 |
| DE | 10 2015 011 536 | 3/2017 |
| EP | 3166307 | 5/2017 |
| JP | 2010-147516 | 7/2010 |

\* cited by examiner

VIEWING SYSTEM WITH FIELD OF VISION SUPERIMPOSITION DEPENDING ON THE DRIVING SITUATION

BACKGROUND OF THE INVENTION

1. Field of the Invention

The present invention relates to a view system for a vehicle, in particular a commercial vehicle, which performs a field of view/area of view superimposition conditioned by the driving situation.

2. Description of the Related Art

In motor vehicles, it is legally prescribed to make so-called fields of view around a vehicle visible for the driver during driving operation. Which fields of view have to be visible is based on the type of the motor vehicle, such as motor cycles, motor vehicles for transporting passengers, motor vehicles for transporting goods, etc. The visibility of the fields of view has to be provided by a device for indirect view and the fields of view have to be visible for a driver, who sits on the driver's seat, all the time by using the device for indirect view. Depending on the type of the vehicle and in particular thereon, which areas around the vehicle can be directly seen by the driver, different legal prescriptions require that certain fields of view are permanently and reliably visible by using the device for indirect view. In Europe, the fields of view which have to be permanent reliably visible for a driver are defined in the UN/ECE-Regulation No. 46, which is further described below. Further, relevant norms and regulations, respectively, include, for instance, the ISO 5721, ISO 5006, ISO 16505, ISO 14401 and the EU 167/2013. Besides the legally required fields of view, often further areas around the vehicle, so-called areas of view, are made visible by the device for indirect view.

Commonly, the observation of the fields of view is possible with one or more mirrors. However, mirrors have some drawbacks. For instance, mirrors show merely objects to the driver which are on the same side of the mirrors as the driver. Any object behind a mirror cannot be shown by this mirror. In addition, mirrors which are merely made from flat glass show the driver a small area, unless the mirrors are very close to the driver. If they are formed convexly, this produces an image distortion. Big vehicles typically have six or more mirrors which are mounted around the outsight of the vehicle and the most of which are distorted and convex, which makes it difficult for the driver to pay attention to all relevant mirrors at the same time. Nevertheless, there are typically still blind spots around these vehicles, despite all of the mirrors.

In recent times, it is becoming increasingly common to consider using camera systems as devices for indirect view either in addition to or as a replacement for the mirrors as devices for indirect view. In such camera systems, an image sensor device continuously captures (detects and stores) an image. The (video-)data captured by the image capture unit are transmitted, e.g., by using a supply unit and optionally after further processing, to a display device located in the driver's cabin. The display device depicts a view into the corresponding legally-prescribed field of view or a plurality of fields of view and optionally supplemental information, such as e.g., possible collision risks, distances to other objects, etc., for the area around the vehicle in a manner that is permanently viewable at all times for the driver. At the same time, the view system offers a superior night vision, more flexible placement options and larger fields of view with the opportunity for less distortion. For example, DE 10 2013 220 839 A1 discloses a camera system for a vehicle.

Permanently viewable means in this context that the view into the field of view is depicted in a timely uninterrupted manner, i.e., not interrupted by alternatingly showing and hiding the fields of view or parts thereof or by overlaying other representations such that the field of view cannot be seen completely. Accordingly, the respective field of view or the fields of view are continuously and in real time shown on the display device. This holds at least for fields of view which have to be permanently visible for all vehicle conditions, in which the ignition is switched on, preferably e.g., coupled to a sensor, which receives a corresponding signal, e.g., a door opening signal or an ignition switch signal.

Modern mirrors create a nearly perfect sharp image for a driver. The level of detail available to the driver is dependent on the distance to the object and the eyesight of the driver. In camera systems, the level of detail is influenced by many different parameters: the resolution of the camera sensor, the field of view of the camera, but also the resolution of the monitor, which part of the camera field of view is shown on the monitor and how big this part is, how far the monitor is spaced from the driver's position/place and the eyesight of the driver. Depending on the combination of those parameters, drivers may be able to zoom in (scale up a view) and see far-off objects clearly that they would be unable to see or to see correspondingly in detail in a mirror. With other combinations of these parameters, however, there might be the case that the driver looks into an area with such a poor resolution that he fails to identify/recognize a dangerous traffic situation.

Further, by using mirrors, natural depths of field may be used, in order to view three dimensions in the mirror. This allows the driver to understand his own position with respect to the environment of objects depicted in the mirror in a comfortable manner. By using camera systems with the commonly available two-dimensional reproductions, there is no depth of field available to the driver which means that the driver has to use the viewable size of features on the monitor, in order to assess their position as well as their speed relative to the vehicle. In particular, this assessment may be difficult, if the driver may zoom in or out of an image (scale up or down a view). In case, it is possible for the driver to zoom in and out of a depicted image, it is likely that he loses the overview of distances of objects. These may lead to dangerous situations on the road.

Further, by using mirrors, the driver may view different areas by inclining and rotating his head. This allows the driver access to a broader (larger) area of view and gives him also a comfortable comprehension what he views in the surrounding environment. Camera systems, however, may be configured pivotably, in order to view different areas. As the driver is accustomed to the using of the physical sensations of inclining and viewing, he may lose the overview, whereto he views exactly in the environment. This can result in a dangerous situation, if the driver misinterprets the location of an object or if the driver causes the camera system to reproduce an irrelevant area of the environment and not the important areas.

Further, the size of the display of the legally prescribed fields of view may result in that the driver does not or not timely identify obstacles, because these are shown on the monitor too small or are even not shown. In particular, in driving maneuvers which are conditioned by the driving situation, such as a turning event or an event of reversing out of a parking lot or reverse driving, there might be an increased risk of accident, as the driver may view into the prescribed field of view for the respective driving maneuver on the monitor, but may not view in detail or may even not view at all into the area with an increased risk of collision which comprises only a small part of a field of view or is even placed outside the shown field of view. Accordingly, especially with commercial vehicles because of their dimensions, bulky geometries and attachments/mountings, if so, there might arise an increased risk of collision, in particular in driving maneuvers conditioned by the driving situation.

DE 10 2015 001 359 A1 discloses a method for reproducing/displaying images of a vehicle environment with a reproduction device. The images of the environment are captured by at least two different image capture devices of the vehicle and at least one of the two image capture devices is a side camera which captures an image of the environment on a left or right side of the vehicle with respect to a longitudinal direction of the vehicle. In this respect, the image of the environment comprises at least a part of a blind spot area of an exterior rear view mirror of the vehicle. Depending of the captured operating condition of the vehicle, at least one of the image capture devices is selected and the image of the environment which is captured by the selected image capture device is shown on the reproduction device.

The reproduction of the entire camera image, that is, the entire image captured by the image capture device, as it is disclosed in DE 10 2015 001 359 A1, however, may result in that the degree of details of the image shown on the reproduction device is not sufficient for identifying an obstacle. This is particular the case, if not only one image, but two or more entire camera images are shown on the reproduction device, in order to show a plurality of areas at risk of collision.

Further view systems are known from DE 10 2013 020 950 A1, DE 10 2015 011 536 A1, DE 10 2015 008 042 B3, DE 10 2012 007 984 A1, DE 10 2013 003 806 A1 and DE 10 2009 045 233 A1.

SUMMARY OF THE INVENTION

Accordingly, it is an object of the present invention to provide a view system for a vehicle, in particular a commercial vehicle, which allows the driver to assess at least one area at risk of collision (collision area) around the vehicle in a driving maneuver conditioned by the driving situation in a quick and safe manner, however, without losing the overview of the environment around the vehicle.

In this respect, a driving maneuver conditioned by the driving situation means every driving maneuver which is performed due to a present or aspired operating situation and which is initiated by the driver of the vehicle and/or a driving assistant system of a driving sensor, if so. Examples for driving maneuvers conditioned by the driving situation may comprise forward and straight drivings, respectively, for instance on public streets or on fields with or without providing a working function of the vehicle, for instance ground processing or mow workings, turning events, lane changes, driving in and driving out of parking lots, etc., or reverse drivings, for instance on public streets or on fields, revers drivings in entrance gates or road junctions, drivingaway events at loading platforms, etc. However, driving maneuvers conditioned by the situation also comprise vehicle shut downs/stops, such as during loading events or during fueling or defueling events.

Areas at risk of collision are areas around the vehicle, in particular the commercial vehicle, which—depending on the respective driving maneuver conditioned by the situation— have an increased collision risk, that is, in which a crash of the vehicle with a body and obstacle, respectively, which is located in the vehicle's environment, is almost certain. In this respect, areas at risk of collision around the vehicle also comprise areas which have the risk of a crash between attachments of the vehicle and an obstacle, e.g., during performing the working function, such as a ground processing or a mowing event, but also if the attachments are not used. A collision and a crash, respectively, of the vehicle may occur with collision objects, such as further vehicles, objects in the environment, such as corners of a house, door posts, sign postings, etc., but also with persons.

The above-mentioned object is solved with a view system for a vehicle with the features according to claim 1. Preferred embodiments are given in the dependent claims.

An embodiment of the invention is based on the idea to monitor an environment of a vehicle, in particular a commercial vehicle, in every operating situation, that is, during drivings/tours, shut downs or during performing of vehicle type associated tasks and to implement the results of the monitoring such that at least one collision area (area at risk of collision) is shown to the driver, in addition to at least a first near area (such as a prescribed field of view) around the vehicle, on a reproduction unit, such as a monitor. In this respect, the at least one collision area is depicted on the reproduction unit in such a detail that identifying of a body and an obstacle, respectively, which is in direct collision risk with the vehicle is possible for the driver without any difficulty, that is, without effort and further adaptation of the image. Thus, the collision area shown to the driver corresponds only to a collision relevant area which is shown on the reproduction unit and has such an exact and high degree of detail, respectively, that the driver may quickly identify the risk of collision and may act correspondingly.

For detailed displaying of the collision area, a partial area is cut out from an image which is captured by a capture unit which is mounted on the vehicle, i.e., a near area around the vehicle, and is shown on the reproduction unit. Accordingly, the collision area depicted on the reproduction unit only corresponds to an image section and a partial area, respectively, of the image which has been captured by a capture unit on the vehicle.

For each driving maneuver and independent on the driving maneuver, a near area around the vehicle, the so called first near area, which may include a legally required field of view and/or a non-legally prescribed area of view, is shown to the driver of the vehicle. If the collision area is located in the field of view or area of view which is to be shown (for the respective driving maneuver) a part of the camera image which comprises the field of view and the area of view, respectively, is cut out and is shown to the driver on the reproduction unit in addition to the entire field of view and area of view, e.g., in an enlarged manner. If the collision area is located outside of the field of view and the area of view, respectively, which is to be shown (for the respective driving maneuver), a part of a camera image which does not comprise the field of view and the area of view, respectively, but comprises the collision area, is cut out and is shown to the driver on the reproduction unit in addition to the field of view and the area of view, e.g., in an enlarged manner. In this respect, the image cut out (image section) is always selected by means of a processing unit (calculation unit) such that preferably only the obstacle (or a part of the obstacle if it has a corresponding size) and the part of the vehicle which possibly collides with this obstacle is to be seen.

The image section which comprises the collision area is preferably adapted continuously and in real time with continuation of a driving maneuver, that is, the image section is continuously selected smaller, in case of an approach of the vehicle to the obstacle, and is continuously selected larger, in case of removal of the vehicle from the obstacle. By showing one or more collision areas in addition of the prescribed fields of view or the areas of view, it is possible for the driver to concentrate alone on the respective driving maneuver and the associated collision risk, without losing sight of the relevant field(s) of view or the area(s) of view.

Preferably, the first near area includes at least one legally prescribed field of view. Legally prescribed fields of view are, for example, defined in the ECE R46, ISO 5721, ISO 5006, ISO 16505, ISO 14401 and the EU 167/2013. By this, the driver may view a legally prescribed field of view and at least one collision area at a glance and, thus, quickly assess the situation around the vehicle and act accordingly.

Further preferably, the reproduction unit is adapted to show the first, and, if so, further near areas permanently and in real time, in order to impart an impression of the environment around the vehicle to the driver which approaches the reality as near as possible. In particular, by using the view system as mirror replacement system in which legally prescribed fields of view are to be shown legal requirements may be fulfilled. In this respect, in principle, it is possible to show only a part of a legally prescribed field of view or an area of view, which does not comprise a legally prescribed field of view, a complete legally prescribed field of view or an area of view permanently and in real time to the driver.

Additionally or alternatively, the reproduction unit is adapted to show the collision area by means of a scale (zoom), whereby the collision area is shown to the driver in more detail and the driver is enabled to identify an alleged collision with an obstacle in a quick manner. Scaling may be performed stepwise/successively or continuously. In this respect, the degree of scaling may either be predetermined and adapted, respectively, by the control unit or may be adjusted by the driver depending on the situation, such as by use of an adjusting knob, a joy stick, via a touch pad, etc.

Preferably, the first near area and the collision area are shown on a common reproduction unit, what has the advantage that the driver may view into the near area as well as the collision area at a glance.

According to a preferred embodiment, the collision area is shown on the common reproduction unit by superimposition, which has the advantage that the driver may distinguish the collision area from the already shown near area in a better manner, and, thus, may gain a quicker impression of the alleged collision situation. For instance, additional separation elements, such as lines, may be provided for distinguishing the collision area from the near area.

Alternatively, the collision area is shown on the common reproduction unit by overlay, such that the near area is still recognizable behind the collision area. With overlaying, the two overlaid images are depicted slightly paler (more faint) in the area of overlay than in a separate/single depiction. In the present case, overlaying is advantageous if the driver wants not only view into the collision area, but also into the near area which is covered by the shown collision area.

A plurality of collision areas are shown on the at least one reproduction unit, in order to show the driver all collision risks which occur at a driving maneuver conditioned by the situation at the same time.

According to a preferred embodiment, the view system further comprises a sensor unit, which detects the respective present driving maneuver conditioned by the situation by receiving a corresponding input signal, and, thus, already at the beginning of a driving maneuver conditioned by the situation, shows the collision areas which are relevant for the driver such that he receives an overview of the vehicle's environment as quick as possible.

The input signal detected by the sensor unit may, for instance, be generated by a manual input of the driver and/or a motion and action, respectively, of the driver. The following driver's actions exemplarily refer to a manual input of the driver: shifting into the reverse gear, operating the turn indicator, operating a button which is followed by a driving maneuver conditioned by the situation, such as operating the warning lights, starting a vehicle based process (extending an overload pipe at a harvester thresher, opening the doors in busses, . . . ), etc. A corresponding signal of a driver assistant system may alternatively or additionally be the input signal which is detected by the sensor unit.

Alternatively and/or additionally, the input signal may be generated by detecting the position of the vehicle. A detection of the position of the vehicle may occur by GPS (Global Positioning System), Galileo, Compass, Glonass or other positioning systems, which are, for instance, satellite supported. This allows a relatively exact prediction of a position of the vehicle with respect to another body and, if so, may even be used for indicating the position of the vehicle relative to another moving body and to forecast a collision prognosis.

Further alternatively or additionally, the input signal may be generated by monitoring the environment around the vehicle, wherein the monitoring around the vehicle occurs by means of the at least one capture unit and/or an additional monitoring unit. By monitoring the vehicle environment, a possible collision risk may be reliably predicted and, thus, a potential collision area may be reliably determined. A combination of different input signals leads to a more reliable collision prediction. Possible additional monitoring units may include additional capture units, radar sensors, ultrasound sensors, sensors with target analysis, etc.

According to a preferred embodiment, the view system comprises at least two reproduction units, wherein at least the collision area is shown on the one of the at least two reproduction units, which is viewed by the driver due to his natural posture and viewing direction depending on the driving maneuver conditioned by the situation. In this respect, the collision area is shown to the driver always on the reproduction unit which he views into during the driving maneuver conditioned by the situation and in which direction he views during the driving maneuver. In other words, thus, the driver sees the collision area always on the reproduction unit which is positioned in his viewing direction during the driving maneuver. In case the driver's view often changes the direction during the driving maneuver, the reproduction of the collision area also changes depending on the viewing direction of the driver from one the other reproduction unit and, if so, back. If the driver intends, for instance, during a turning event, to drive a curve to the right and indicates this by operating the turning indicator and, thus, by a corresponding turning signal, it is assumed that the driver turns his view to the right during the turning event. Accordingly, at least the collision areas (as viewed in driving direction right in front of and left behind the vehicle) are shown to the driver on the right monitor of two monitors provided in the driver's cabin. Accordingly, an ergonomic reproduction of the collision areas may be reliably provided.

The viewing directions of the driver which are commonly taken during the different driving maneuvers may be determined empirically, for instance, stored in a data base and read back, if required. Alternatively, the viewing direction of the driver may also be detected by capturing driver's data, such as driver's motions or eye motions, e.g., by means of eye tracking.

According to a further preferred embodiment, the view system further comprises at least a further reproduction unit, wherein the near area and the collision area are shown separately on the at least one reproduction unit and the at least one further reproduction unit.

Preferably the view system further comprises at least a second capture unit which is adapted to capture at least a second near area around the vehicle, wherein the at least one first near area and the at least one second near area are adjacent to each other, or, alternatively, are not adjacent to each other. By a plurality of capture units, the environment around the vehicle may be monitored more reliably and possible collision areas may be detected more reliably.

Preferably the collision area corresponds to a part of the first near area. Thus, the collision area is an image section of the image which corresponds to the first near area, whereby a collision area which is located in the near area is shown to the driver in more detail.

According to a preferred embodiment, the collision area corresponds to a part of the second near area. Further preferably, the collision area and the first near area or the second near area may be adjacent to each other. Thereby, the driver receives a quick overview over the collision area and a further near area and, thus, can assess the situation around the vehicle both with respect to an alleged collision risk and with respect to further information (e.g., whether the driving maneuver occurs as planed) in a better manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is described exemplarily with reference to the annexed figures, in which.

DETAILED DESCRIPTION OF THE PRESENTLY PREFERRED EMBODIMENTS

In the following description, the direction in which a vehicle moves forward is called forward direction and the direction in which a vehicle moves rearward, that is, in which a vehicle drives to the back, is called rearward direction. The extension of the vehicle in the forward/rearward direction is called vehicle length and the extension of the vehicle lateral/perpendicular to the forward/rearward direction is called vehicle width. The forward/rearward direction is also called longitudinal direction of the vehicle.

Figure 1:
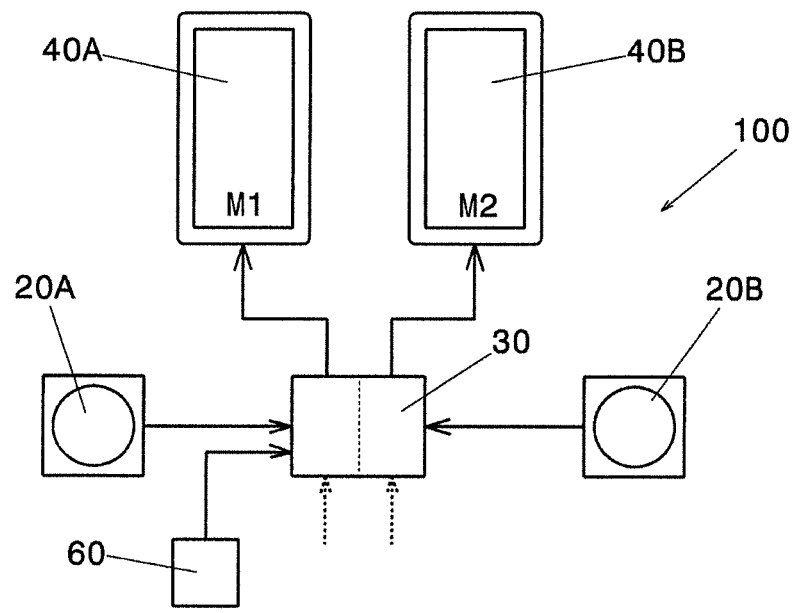
FIG. 1 shows a schematic structure of the view system according to the invention.

FIG. 1 shows a schematic structure of a view system 100 of a vehicle (not shown) according to the invention. The view system 100 has two capture units 20A, 20B, a control unit (calculation unit) 30 and two reproduction units 40A, 40B. The capture unit 20A, 20B may be cameras, image sensors or the like. The reproduction units 40A, 40B may be monitors M1, M2. The control unit 30 is configured for data processing, for instance, image data which are captured by the capture units 20A, 20B, and may be a processor, such as an ECU. The capture units 20A, 20B are connected with the control unit 30 such that the image data captured by the capture units 20A, 20B may be transferred to the control unit. The control unit 30 is connected to each of the reproduction units 40A, 40B such that the image data processed by the control unit may be transferred to the reproduction units 40a, 40b. The control unit 30 may have a processor for each of the capture units 20A, 20B and reproduction units 20A, 20B each of which is connected with a corresponding capture unit 30A, 30B and a corresponding reproduction 40A, 40B. Alternatively, the control unit 30 may have a common processor for all capture units 30A, 30B and reproduction units 40A, 40B. Further, the control unit 30 may receive signals from a sensor unit 30 for capturing an operating situation and a driving maneuver conditioned by the situation, respectively. Signals, which indicate driving maneuvers conditioned by the situation may be one or more of the following signals: shifting into the reverse gear, operating the turning indicator, operating a bottom which is followed by a driving maneuver conditioned by the situation, such as operating the warning lights, starting a vehicle based process (extending an overload pipe of a harvester-thresher, opening the doors of busses, . . . ), etc. Alternatively or additionally, a corresponding signal of a driver assistant system may also be the input signal detected by the sensor unit. The control unit 30 may receive further data in addition to the image data of the capture units 20A, 20B (indicated by dashed arrows in FIG. 1), such as data of further sensors.

If mirror replacement systems are used for viewing legally prescribed fields of view or areas of view which are not legally prescribed, commercial vehicles commonly have two reproduction units which are usually mounted on the left and right, respectively, A-pillars. On the reproduction unit which is mounted on the left A-pillar, the camera image or the camera images of one or more cameras which are attached to the left outer side of the vehicle are shown. On the reproduction unit which is mounted on the right A-pillar, the camera image or the camera images of one or more cameras which are attached to the right outer side of the vehicle are shown. During a reproduction of legally prescribed fields of view, the image/the images of the cameras at the left outer side has/have to be visible always on the left reproduction unit, whereas the image/the images of cameras on the right outer side always have to be visible also on the right reproduction unit. A side-inverted reproducing of the right and left images, i.e., a reproduction of the image which is captured by the right camera on the left reproduction unit and, accordingly, the reproduction of the image captured by the left camera on the right reproduction unit is not admitted, if legally prescribed fields of view are shown. However, if a plurality of images is shown per reproduction unit, it is permitted to show these side by side, on top of each other, into each other or in a similar manner, as long as a legally prescribed field of view is not covered by another field of view or area of view. For reproducing further areas, additional reproduction units may be provided, if necessary.

Figure 2:
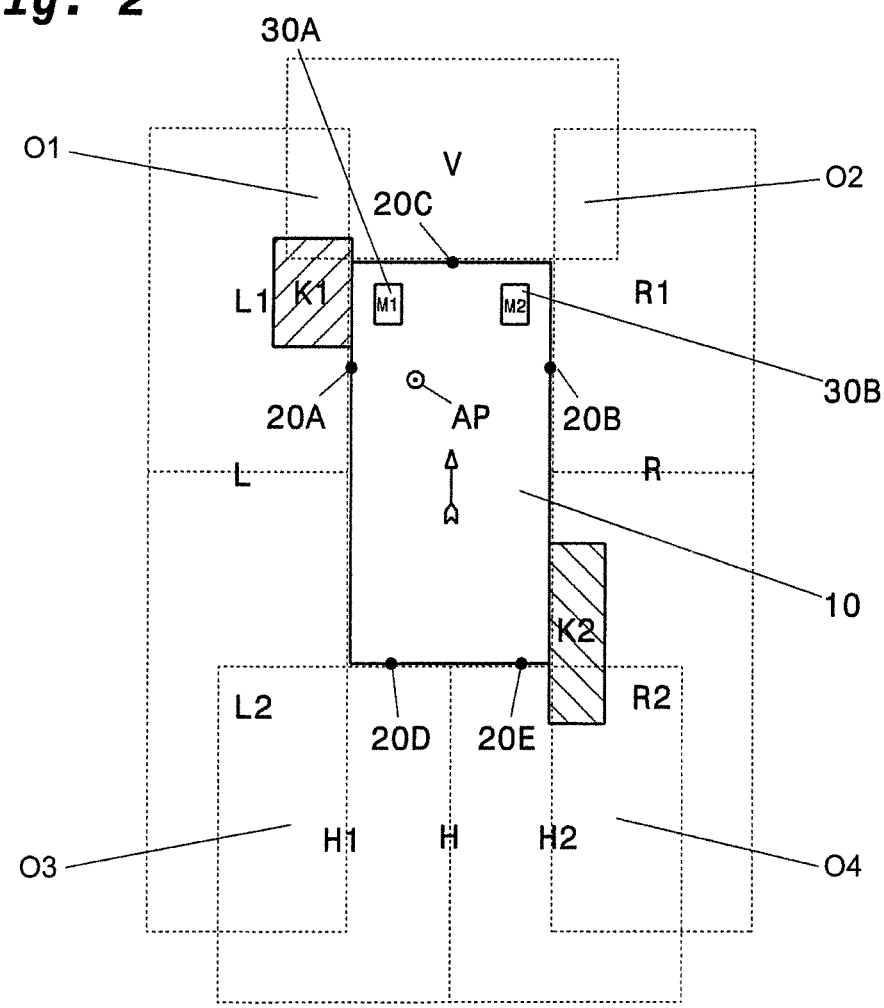
FIG. 2 shows a schematic plan view of a vehicle with areas of view and collision areas arranged there around.

FIG. 2 schematically shows a plan view of a vehicle 10. The arrow indicates the driving direction of the vehicle 10 to the front. In the vehicle 10, two monitors M1, M2 are located. The reference number AP denotes the eye point of a (not shown) driver which sits on the (not shown) driver's seat in the vehicle 10. At the outer surfaces of the vehicle 10 five capture units 20A, 20B, 20C, 20D, 20E are attached: The capture unit 20A is located on the left side of the vehicle 10. The capture unit 20B is located on the right side of the vehicle 10. The capture unit 20C is located on the front side of the vehicle 10. The capture units 20D, 20E are located at the back side of the vehicle 10. The image capture units 20A, 20B, 20C, 20D, 20E capture four near areas L, R, V, H around the vehicle 10. The capture unit 20A captures a near area L on the left of the vehicle 10. The capture unit 20B captures a near area R on the right side of the vehicle 10. The capture unit 20C captures a near area V in front of the vehicle 10. The capture units 20D, 20E capture a near area H behind the vehicle 10.

The near area L is located on the left adjacent to the vehicle 10 in the plan view of FIG. 2. The extension of the near area L adjacent to the vehicle 10 in the longitudinal direction of the vehicle 10 is larger than the length of the vehicle 10 itself, wherein the near area L extends more beyond the rear end of the vehicle 10 than beyond the front end of the vehicle 10. The near area L is divided in two near areas L1, L2 in the width direction of the vehicle 10, wherein the near area L1 is located in front of the near area L2 in the length direction. The near area R is located on the right adjacent to the vehicle 10 in the plan view of FIG. 2 and, as the near area L, has two near areas R1, R2. For the rest, the near area R corresponds to the near area L and corresponding explanations are omitted. The near area V extends in the forward direction in front of the vehicle 10. The extension of the near area V in front of the vehicle 10 is in the width of the vehicle 10 larger than the width of the vehicle 10 itself. The near area H extends in the forward direction behind the vehicle 10. The extension of the near area H in front of the vehicle 10 is in the width direction of the vehicle 10 larger than the width of the vehicle 10 itself and is larger than the extension of the near area V in the width direction of the vehicle 10. The extension of the near area H has also a larger extension in the forward direction than the near area V. The near area H is divided in two near areas H1, H2 in the longitudinal direction of the vehicle 10, wherein the near area H1 in the width direction is located on the left adjacent to the near area H2. Due to their bigger extensions than the length and width of the vehicle 10, the areas L1 and V constitute an overlap area O1 diagonally left in front of the vehicle 10 and the areas R1 and V constitute an overlap area O2 diagonally right in front of the vehicle 10. In the same way, the areas L2 and H1 constitute an overlap area O3 diagonally left behind the vehicle 10, and the areas R2 and H2 constitute an overlap area O4 diagonally right behind the vehicle 10. The near areas 1, 2, 3, 4 may contain legally prescribed field of views and/or further (not legally prescribed, if so) areas of view.

The near area L1 comprises a collision area K1. Die collision area K1 is an image section from the near area L1 and extends directly adjacent to the left vehicle outer side and into the overlap area O1. The near area R2 comprises a collision area K2. The collision area K2 is an image section from the near area R2 and extends directly adjacent to the right vehicle outer side and into the overlap area O4.

Figure 3:
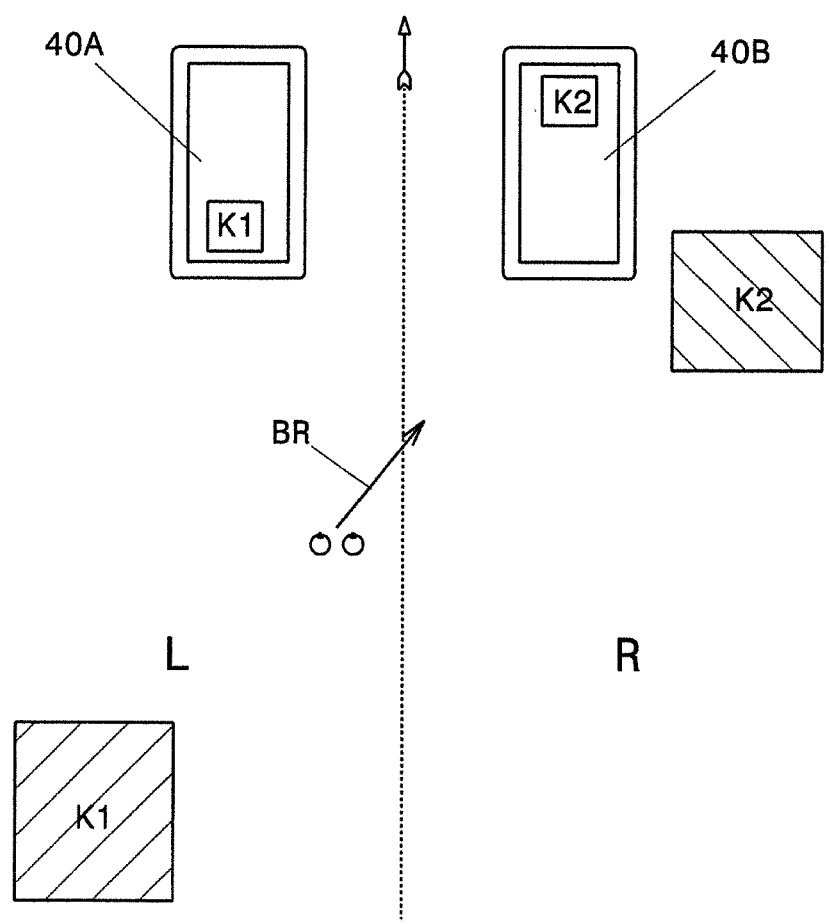
FIG. 3 shows a schematic view of two reproduction units, a driver and two collision areas.

FIG. 3 shows a schematic view of two reproduction units 40A, 40B, a driver and tow collision areas K1, K2. The arrow indicates the driving direction of the (not shown) vehicle. The dotted line beneath the arrow indicates the longitudinal axis of the vehicle. The collision area K1 is located on the left adjacent to the vehicle and the collision area K2 is located right adjacent to the vehicle, wherein the collision area K2 is located in the forward direction more forward than the collision area K1. The main viewing direction BR of the driver who is only schematically depicted by means of a pair of eyes is directed, in FIG. 3, diagonally forward to the right to the reproduction unit 40B. In order to provide the driver with an assessment of the environment around the vehicle as quick as possible, in particular of the collision areas K1 and K2 which are not or only poorly visible for the driver, the collision area K1 on the left reproduction unit is shown in a lower portion thereof and the collision area K2 on the right reproduction unit is shown in an upper portion thereof. By an arrangement of a collision area which is located adjacent to a rear part of the vehicle in the lower portion of the monitor and vice versa, an arrangement of a collision area which is located adjacent to a front part of the vehicle in the upper portion of a (further) monitor, i.e., a different arrangement of the collision areas on the monitors, the driver is allowed to quickly assess an alleged collision risk. In other words, it is intuitively easily possible for the driver by such an arrangement to distinguish the two collision areas at a glance on the monitor and to associate the collision areas to corresponding areas around the vehicle.

The decision/selection on which reproduction unit a collision area is shown may be based on a driving maneuver conditioned by the situation and the predictable viewing direction which comes along therewith. For instance, if the driver indicates by operating the right signal indicator that he intends to turn right, according to experience, the view of the driver will also move to the right during the turning event. Then, a collision area which occurs during the turning event is shown to the driver on the right reproduction unit, in order to allow the driver to quickly and ergonomically assess the collision area(s) during the turning event. Alternatively, the decision on which reproduction unit a collision area is shown may be made by monitoring and detecting the driver's behaviour. For instance, if the driver turns his head during a driving maneuver conditioned by the situation in the direction of one of the two reproduction units, this head movement or only alone the eye movement may be detected by means of a special sensor and the reproduction may occur on the reproduction unit which is viewed by the driver at the moment.

The collision area K1 may be shown on the reproduction unit as a picture-in-picture, as superimposition, as overlay or in the split-screen-method. In addition, the reproduction of the collision area K1 may involve an acoustic signal.

Figure 4A:
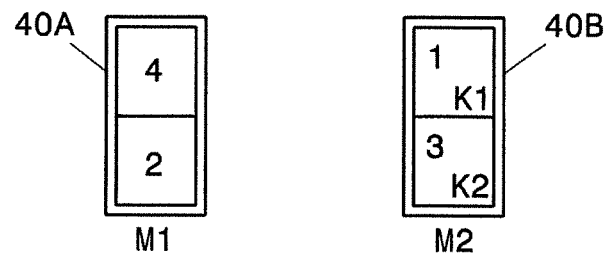
FIG. 4a shows a schematic view of two reproduction units with areas of view and collision areas depicted thereon according to a first embodiment.
Figure 4B:
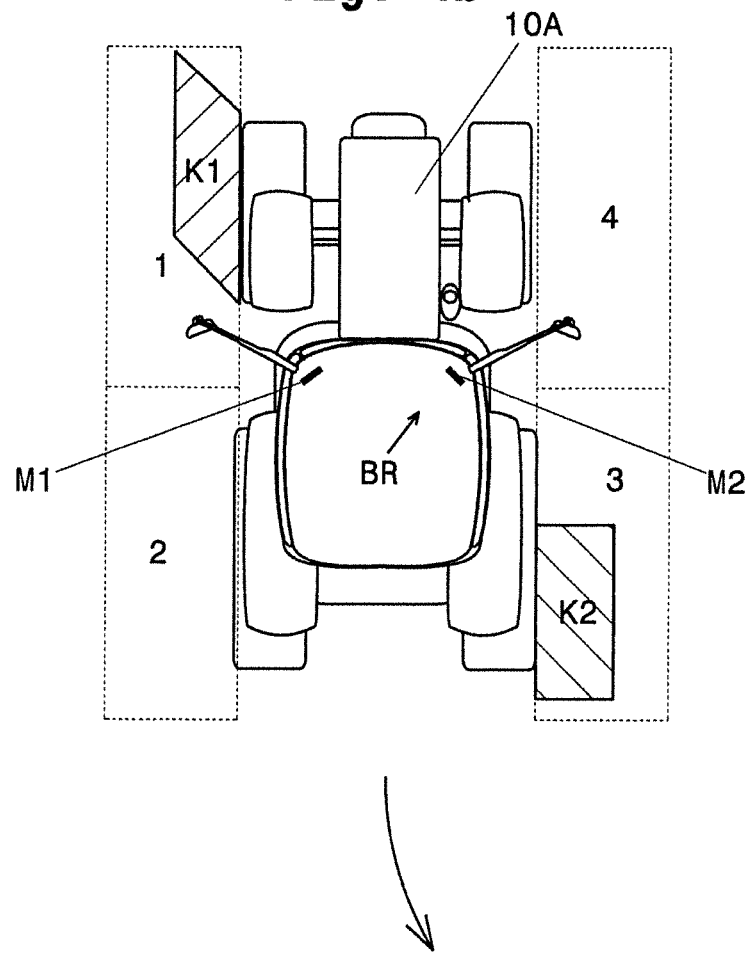
FIG. 4b shown a schematic plan view of a commercial vehicle around which the areas of view and collision areas, which are depicted in FIG. 4a, are arranged there around.

FIG. 4a shows a schematic view of two reproduction units 40A, 40B with near areas 1, 2, 3, 4 depicted thereon, with fields of view and areas of view, respectively, and collision areas K1, K2 according to a first embodiment. In FIG. 4b, the arrangement of the near areas 1, 2, 3, 4 and the collision areas K1, K2 around a vehicle, for instance, an agricultural tractor 10A, which is associated to FIG. 4a is shown in a plan view. In the driver's cabin, the tractor 10A has two monitors M1, M2 which correspond to the reproduction units 40A, 40B of FIG. 4a.

Around the tractor 10A four near areas (areas of view and fields of view, respectively) are arranged which are captured by capture units (not shown) which are mounted on the tractor 10A at corresponding locations. The near area 1 is located in the forward direction on the left adjacent to the left front wheel. The near area 2 is located in the forward direction on the left adjacent to the left rear wheel. The near area 3 is located in the forward direction on the right adjacent to the rear wheel. The near area 4 is located in the forward direction right adjacent to the right front wheel. The near areas 1 and 2 and the near areas 3 and 4, respectively, are in the longitudinal direction of the tractor 10A adjacent to each other. All four near areas 1, 2, 3, 4 are adjacent to the tractor 10A at the side facing the tractor 10A.

The tractor 10A shown in FIG. 4b is going to perform a cornering during reverse driving to the right back (see curved arrow in the lower portion of FIG. 4b). In order to be able to view into the near area 3 at risk of collision, during such a driving maneuver, the driver usually views into the right outside rear view mirror and, with a mirror replacement system, to the right monitor M2 which shows the image of an image capture unit (not shown) which is mounted on the right outer side. Thus, the viewing direction BR of the driver is directed to the right front in FIG. 4b (see arrow BR in the driver's cabin).

In the driving maneuver shown in FIG. 4b (cornering to the right back), a collision area K1 arises in the area of the left front wheel and a collision area K2 arises in the area of the right rear wheel. Specifically, in the shown cornering to the right back, the front part of the tractor 10A will sheer out to the left, while the rear part of the tractor will sheer out to the right. Thus, there is the risk that the tractor 10A collides on the left front and on the right back. Such a collision occurs between a body and the left front wheel/the left front fender and a body and the right rear wheel/the right rear fender, respectively. Accordingly, the collision area K1 does not correspond to the entire near area 1, but only to a partial portion of near area 1, which is located next to the left front wheel and next to the left front fender, respectively. Analogously, the collision area K2 corresponds to the partial portion of the near area 3 which is located next to the right rear wheel and next to the right rear fender, respectively. In FIG. 4b, both collision areas K1, K2 are depicted as hatched planes and each of the collision areas generally indicates a portion which has the greatest risk of a crash between the tractor 10A and a further body (not shown) during a driving maneuver conditioned by the situation.

In FIG. 4a it is to be seen that the collision areas K1, K2 are shown to the driver on the right monitor M2 of the two monitors M1, M2 which are arranged in the driver's cabin due to the expected viewing direction (see arrow BR to the right front in FIG. 4b), in order to allow the driver to quickly view into the two collision areas K1, K2 under ergonomical view points. Thus, the driver may quickly and reliably assess the collision risk in the collision areas K1, K2 without unnecessary rotating his head. In the example shown in FIG. 4a, the near area 1 is shown together with the collision area K1 in the upper half of the monitor M2, whereas the near area 3 is shown together with the collision area K2 in the lower half of the monitor M2. On the left monitor M1, the remaining two near areas 2 and 4 are shown, wherein the near area 4 is shown in the upper half and the near area 2 is shown in the lower half of the monitor M2. Therefore, in the embodiment shown in FIG. 4a and FIG. 4b, the collision areas K1, K2 extracted/took out from near areas 1, 3 are shown together with the corresponding near areas 1, 3 on the reproduction unit 40A, 40B. Thereby, the driver may quickly view the relevant near areas 1, 3 and, at the same time, the near areas K1, K2 with an increased collision risk with greater detail depth compared to the common depiction of each of the near areas 1, 3 depending on the corresponding driving maneuver. However, it is also possible, that near areas are shown together with collision areas which are not extracted/took out from the corresponding near areas. For instance, as possible (not shown) modification of the embodiment shown in FIG. 4b, the near area 2 may be shown together with the collision area K2 and the near area 4 may be shown together with the collision area 1, in order to give the driver a quick impression about the entire vehicle environment.

Figure 5A:
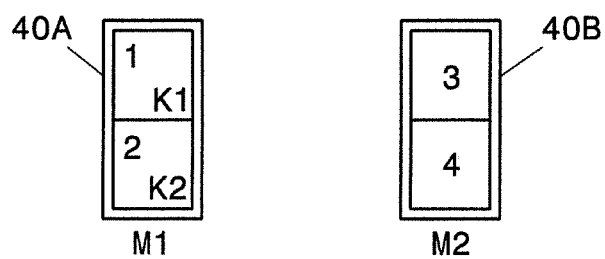
FIG. 5a shows a schematic view of two reproduction units with areas of view and collision areas depicted thereon according to a second embodiment.
Figure 5B:
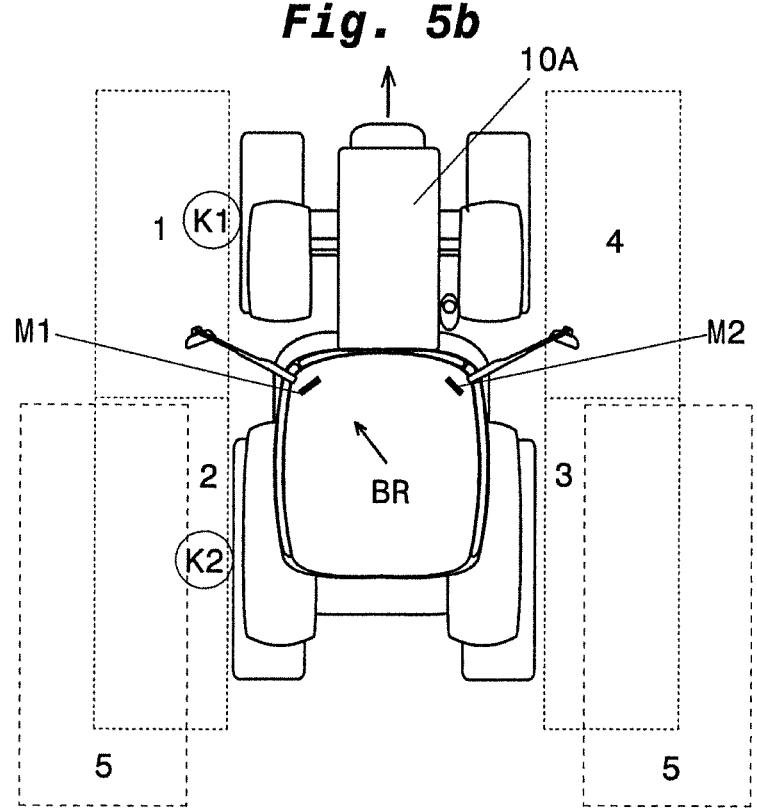
FIG. 5b shows a schematic plan view of a commercial vehicle around which the areas of view and collision areas, which are depicted in FIG. 5a, are arranged there around.

FIG. 5a shows a schematic view of two reproduction units 40A, 40B with near areas 1, 2, 3, 4, 5, partially with fields of view, and collision areas K1, K2 depicted thereon according to a second embodiment. In FIG. 5b, the arrangement of the near areas 1, 2, 3, 4 and the collision areas K1, K2 associated to FIG. 5a are to be seen. As in FIG. 4b, also in FIG. 5b, an agricultural tractor 10A which has two monitors in the driver's cabin is shown in a plane view. The near areas 1, 2, 3, 4 arranged around the tractor 10A correspond to the near areas 1, 2, 3, 4 as shown in FIG. 4b. Thus, a description of near areas 1, 2, 3, 4 is omitted in FIG. 5b. Additionally, in FIG. 5b, further near areas 5 (dotted line) which are alternative near areas to the near areas 2, 3 are to be seen. Each of the near areas 5 is located at the height of the left and right rear wheel of the tractor 10A, respectively, however, compared to the near areas 2 and 3 slightly spaced apart from each of the rear wheels and extends slightly more to the rear than the near areas 2 and 3.

The tractor 10A, shown in FIG. 5b, performs a driving straight forward (see arrow in the upper part of FIG. 5b). In order to monitor the vehicle environment, during driving straight forward, the driver mainly views into the left exterior rear view mirror and, in case of a mirror replacement system, into the left monitor M1 which shows the image of an image capture unit (not shown) which is mounted on the left side. Thus, the viewing direction BR of the driver runs in FIG. 5 to the left front (see arrow BR in the driver's cabin).

In the driving maneuver shown in FIG. 5b (driving straight forward), in the area of the left front wheel, a collision area K1 and, in the area of the left rear wheel, a collision area K2 may occur, for instance, by a further vehicle which overtakes the tractor 10A. Thus, there is the risk that the tractor 10A collides with another body at left front and rear. Such a collision occurs between a body and the left front wheel/the left front fender and a body and the left rear wheel/the left rear fender, respectively. Thus, the collision area K1 as in the embodiment shown in FIG. 4b does not correspond to the entire near area 1, but only to a partial portion of the near area 1 which is located next to the left front wheel and next to the left front fender, respectively. Analogously, the collision area K2 corresponds to a partial portion of the near area 2 which is located next to the left rear wheel and next to the left rear fender, respectively. In FIG. 5b, the collision areas K1, K2 are depicted as circular planes.

In FIG. 5a it is to be seen that the collision areas K1, K2 are shown to the driver on the left monitor M1 of both monitors M1, M2 arranged in the driver's cabin due to the expected viewing direction (see arrow BR to the left front in FIG. 5b), in order to allow the driver a quick understanding of the two collision areas K1, K2 under ergonomical view points, as already in the embodiment shown in FIG. 4a. In the example shown in FIG. 5a, the near area 1 is shown together with the collision area K1 in the upper half of the monitor M1, whereas the near area 2 is shown together with the collision area K2 in the lower half of the monitor M1. On the right monitor M2, the remaining both near areas 3 and 4 are shown, wherein the near area 3 is shown in the upper half and the near area 4 is shown in the lower half of the monitor M2.

Figure 6A:
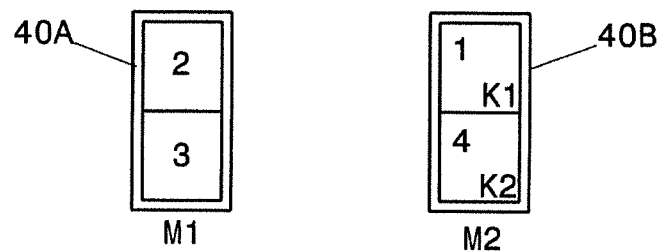
FIG. 6a shows a schematic view of two reproduction units with areas of view and collision areas depicted thereon according to a third embodiment.
Figure 6B:
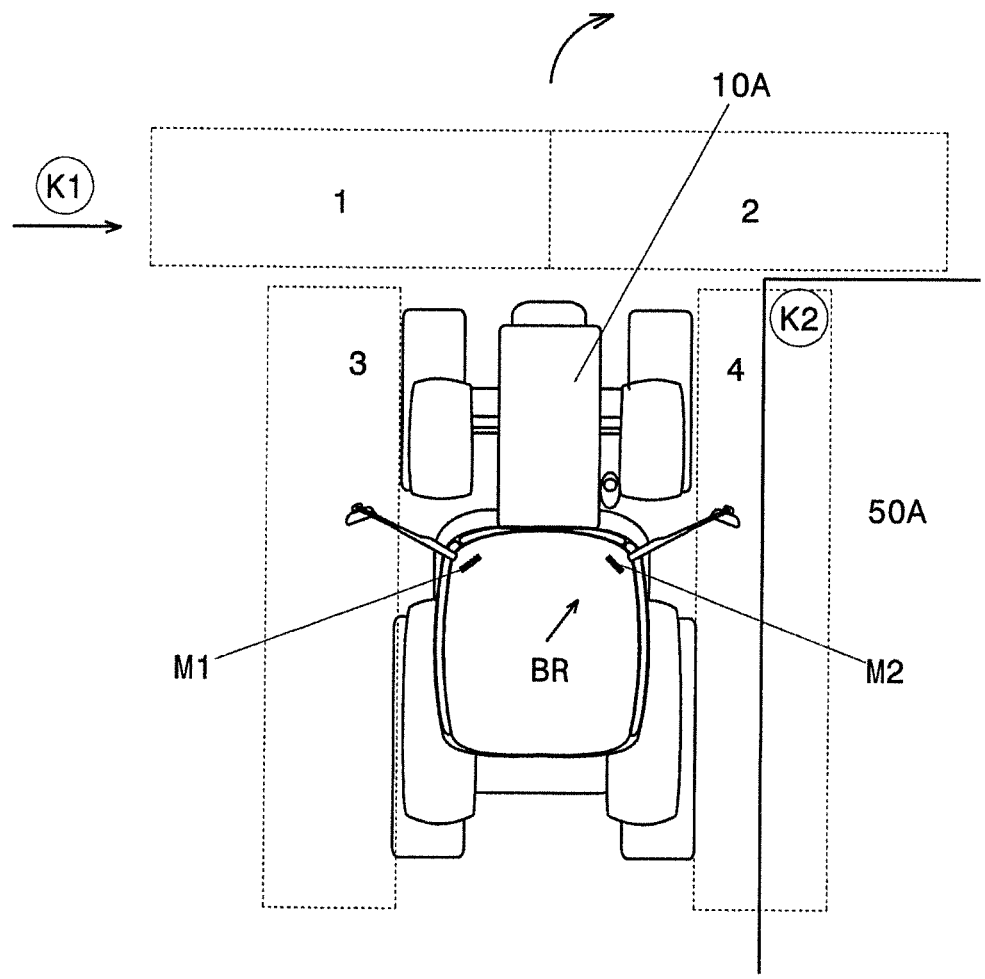
FIG. 6b shows a schematic plan view of a commercial vehicle around which the areas of view and collision areas, which are depicted in FIG. 6a, are arranged there around.

FIG. 6a shows a schematic view of two reproduction units 40A, 40B with near areas 1, 2, 3, 4, with fields of view and areas of view, respectively, and collision areas K1, K2 depicted thereon according to a third embodiment. In FIG. 6b, the arrangement of the near areas 1, 2, 3, 4 and the collision areas K1, K2 associated to FIG. 6a are to be seen. As in FIGS. 4b and 5b, also in FIG. 6b, an agricultural tractor 10A which has two monitors M1, M2 in the driver's cabin is shown in a plane view. The near areas 1 and 2 arranged around the tractor 10A extend in the width direction of the tractor 10A adjacent to each other in front of the tractor 10A and extend entirely largely beyond the width of the tractor 10A. The near area 3 extends on the left adjacent to the tractor 10A and corresponds in its longitudinal extension approximately to the length of the tractor 10A. The near area 4 is extends on the right adjacent to the tractor 10A and corresponds in its longitudinal extension also approximately to the length of the tractor 10A. On the right adjacent to the tractor 10A, there is building 50A. The near area 4 comprises a part of the building 50A.

The tractor 10A shown in FIG. 6b performs a cornering to the right front (see arrow in the upper part of FIG. 6b), in order to turn to the right behind the building 50A which is located to the right of tractor 10A. In order to monitor the vehicle environment, during such a cornering event, the driver mainly views into the right outside rear view mirror and, in case of a mirror replacement system, into the right monitor M2 which shows the image of an image capture unit (not shown) mounted on the right outer side. Thus, the viewing direction BR of the driver runs to the right front in FIG. 6b (see arrow BR in the driver's cabin).

During the driving maneuver shown in FIG. 6b (cornering to the right front), a collision area K1 is generated in the near area 1, that is, to the left of the tractor 10A, for instance by an approaching further vehicle (not shown), that crosses the lane of the tractor 10A, and, in the portion of the corner of the building 50A, around which the driver intends to turn, a collision area K2 is generated. Thus, there is a risk that the tractor 10A collides with another vehicle on the right front and collides with the building corner on the right front. Accordingly, the collision area K1 does not correspond to the entire near area 1, but only to a partial portion of the near area 1 which represents an approaching car. Analogously, a collision area K2 corresponds to a partial portion of the near area 2 which represents the building corner. In FIG. 6b, the two collision areas K1, K2 are depicted as circular planes.

In FIG. 6a, it is to be seen that the collision areas K1, K2 are shown to the driver on the right monitor M2 of the two monitors M1, M2 arranged in the driver's cabin due to the expected view direction (see arrow BR to the right front in FIG. 6b), in order to allow the driver a quick view into the two collision areas K1, K2 under ergonomical view points, as already in the embodiments shown in FIGS. 4a and 5a. In the example shown in FIG. 6a, the near area is shown together with a collision area K1 in the upper half of the monitor M2, whereas the near area 4 is shown together with the collision area K2 in the lower half of the monitor M2. On the left monitor M1, the remaining both near areas 2 and 3 are shown, wherein the near area 2 is shown in the upper half and the near area 3 is shown in the lower half of the monitor M1.

Figure 7A:
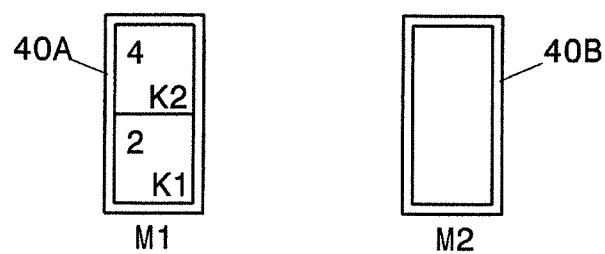
FIG. 7a shows a schematic view of two reproduction units with areas of view and collision areas depicted thereon according to a fourth embodiment.
Figure 7B:
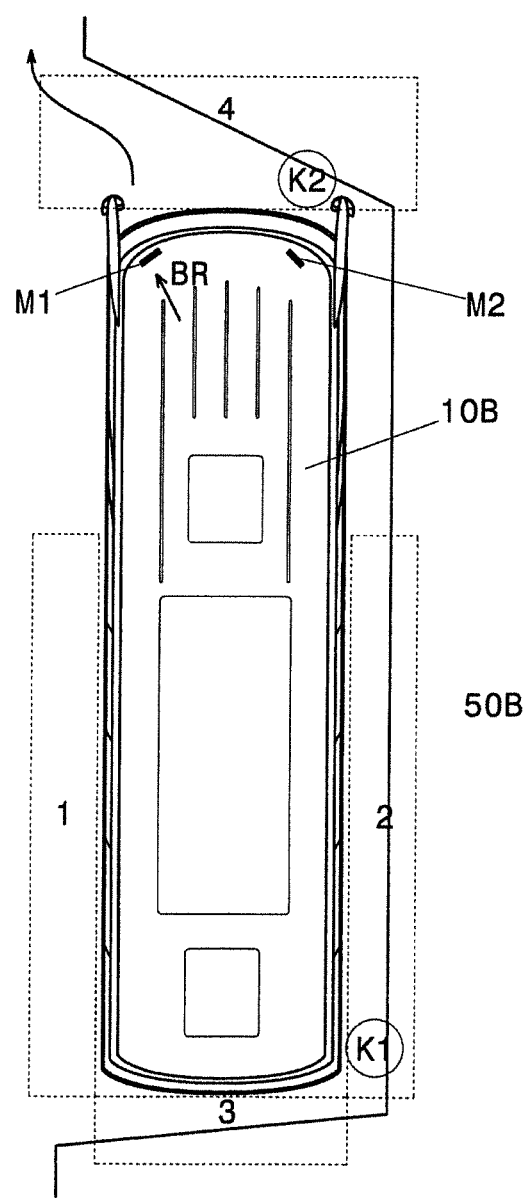
FIG. 7b shows a schematic plan view of a commercial vehicle around which the areas of view and collisions areas, which are depicted in FIG. 7a, are arranged there around.

FIG. 7a shows a schematic view of two reproduction units 40A, 40B with near areas 2, 4, with fields of view and areas of view, respectively, and collision areas K1, K2 depicted thereon according to a forth embodiment. In FIG. 7b, the arrangement of near areas 2, 4 and the collision areas K1, K2 which is associated to FIG. 7a is to be seen. In FIG. 7b, a bus 10B which has two monitors M1, M2 in the driver's cabin is shown in a plane view. The near areas 1 and 2 arranged around the bus 10B are located right and left, respectively, adjacent to the bus 10B and extend slightly from the height of the rear edge of the bus 10B up to the center of the bus 10B in its length direction. In FIG. 7b, also a near area 3 which is located behind the bus 10B and corresponds approximately to the width of the bus 10B and a near area 4 which is located in front to the bus 10B and which extends beyond the width of the bus 10B is to be seen. On the right of the bus 10B, an obstacle 50B is arranged which is constituted by a cavity of a parking lot which corresponds approximately the size of the bus and in which the bus 10B is located. The near areas 2, 3 and 4 have an overlapping area with the obstacle 50B.

The bus 10B shown in FIG. 7b is going to reverse to the left out of the parking lot constituted by obstacle 50B (see arrow in the upper part of FIG. 7b). In order to monitor the vehicle environment during the reversing-out event, the driver views commonly into the left outside rear view mirror and, in case of a mirror replacement system, into the left monitor M1 which shows the image of an image capture unit (not shown) mounted on the left outer side. Thus, the viewing direction BR of the driver runs to the left front in FIG. 7b (see arrow BR in the driver's cabin).

In the driving maneuver shown in FIG. 7b (reversing-out event to the left), in the near area 2, specifically at the height of the right rear wheel, a collision area K1 is generated and, in the near area 4, at the height of the front right corner of the bus 10B, a collision area K2 is generated. Thus, there is a risk that the bus 10B collides on the front right and the rear right with the obstacle 50B. Accordingly, the collision area K1 does not correspond to the entire near area 2, but only to a partial portion of the near area 2. Analogously, the collision area K2 corresponds to a partial portion of the near area 4. In FIG. 7b, the two collision areas K1, K2 are depicted as circular planes.

In FIG. 7a it is to be seen that the collision areas K1, K2 are shown to the driver on the left monitor M1 of the two monitors M1, M2 arranged in the driver's cabin due to the expected viewing direction (see arrow BR to the left front in FIG. 7b), in order to allow the driver a quick overview over the two collision areas K1, K2 under ergonomical view points, as already in the embodiments shown in FIGS. 4a, 5a and 6a. In the example shown in FIG. 7a, the near area 2 is shown together with a collision area K1 in the lower half of the monitor M1, whereas the near area 4 is shown together with the collision area K2 in the upper half of the monitor M1. On the right monitor M2, the remaining near areas 1 and 2 may be shown.

Figure 8A:
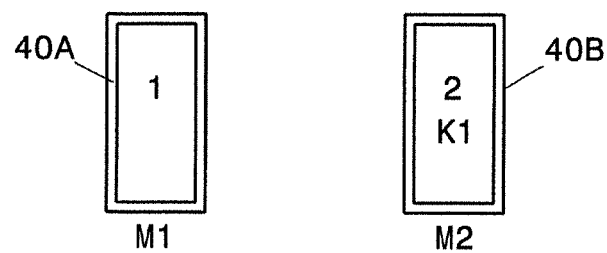
FIG. 8a shows a schematic view of two reproduction units with areas of view and collision areas depicted thereon according to a fifth embodiment.
Figure 8B:
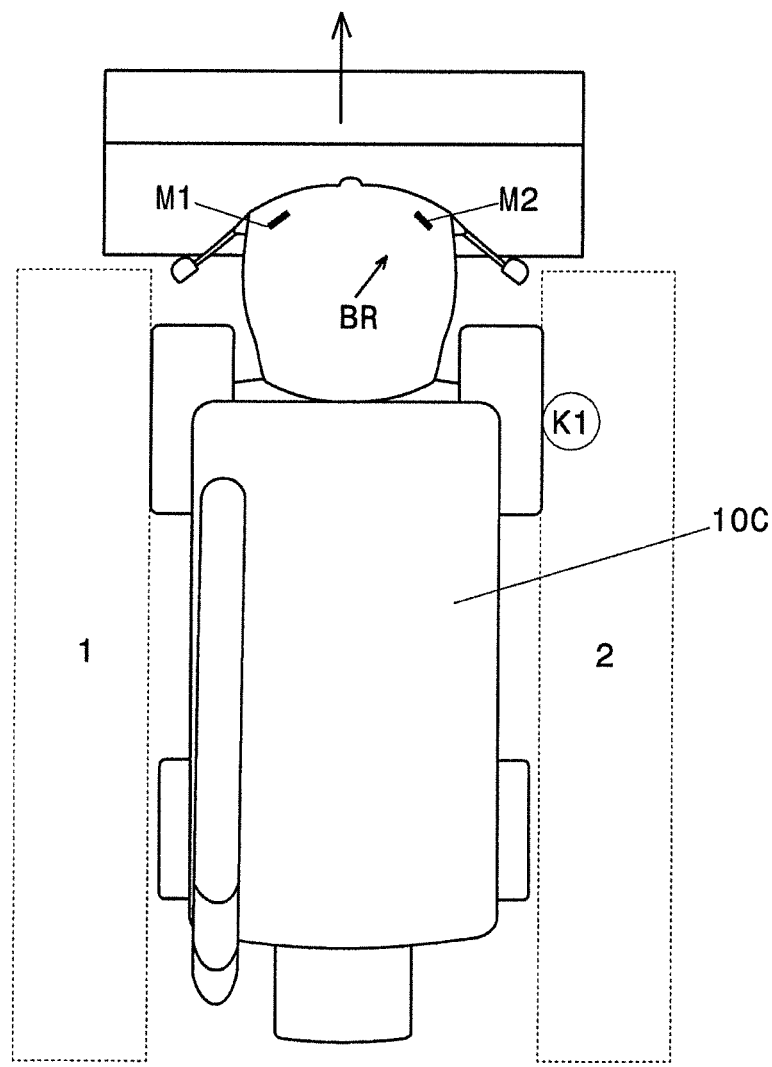
FIG. 8b shows a schematic plan view of a commercial vehicle around which the areas of view and collision areas, which are depicted in FIG. 8a, are arranged there around.

FIG. 8a shows a schematic view of two reproduction units 40A, 40B with near areas 1, 2 with fields of view and areas of view and a collision area K1 depicted thereon according the a fifth embodiment. In FIG. 8b, the arrangement of the near areas 1, 2 and the collision areas K1 around a vehicle associated to FIG. 8a are to be seen. In FIG. 8b, a commercial vehicle 10C with an attachment (working tool) arranged in the forward direction in front of the commercial vehicle (such as a snow bucking plate) is shown in a plane view. As the vehicles shown in the other embodiments, the commercial vehicle 10C shown in FIG. 8b also has two monitors M1, M2 in the driver's cabin. The near areas 1 and 2 arranged around the commercial vehicle extend left and right, respectively, adjacent to the commercial vehicle 10C and extend from a rear edge of the commercial vehicle 10C in the longitudinal direction of the vehicle up to the height (position) of the outside rear view mirror.

The commercial vehicle 10C shown in FIG. 8b is going to drive straight forward (see arrow in the upper part of FIG. 8b). On the right side, on the height (position) of the right front wheel, an obstacle (not shown) is located with which the commercial vehicle 10B may collide when driving straight forward. Thus, a collision area K1 is located on the side of the right front wheel. In FIG. 8b, the collision area K1 is depicted as circular plane. In order to monitor the collision area K1 during the planed driving maneuver, namely the driving straight forward, the driver views mainly into the right outside rear view mirror and, in case of a mirror replacement system, into the right monitor M2, which shows the image of an image capture unit (not shown) mounted to the right outer side during such a driving maneuver. Thus, the viewing direction BR of the driver runs in FIG. 8b to the right front (see arrow BR in the driver's cabin).

In FIG. 8a it is to be seen that the collision K1 is shown to the driver on the right monitor M2 of the two monitors M1, M2 arranged in the driver's cabin due to the expected viewing direction (see arrow BR to the right front in FIG. 8b), in order to allow the driver a quick overview over the collision area K1 under ergonomical view points, as already in the embodiments shown in FIGS. 4a, 5a, 6a and 7a. In the example shown in FIG. 8a, the near area 2 is shown together with the collision area K1 in the entire monitor M2, whereas the near area 1 is shown on the monitor M2.

Figure 9A:
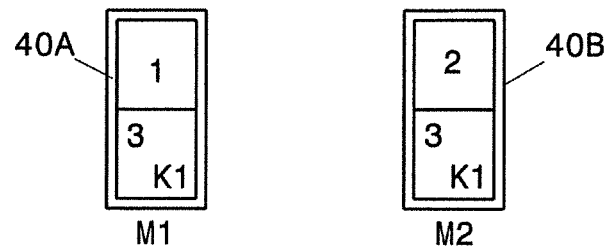
FIG. 9a shows a schematic view of two reproduction units with areas of view and collision areas depicted thereon according to a sixth embodiment.
Figure 9B:
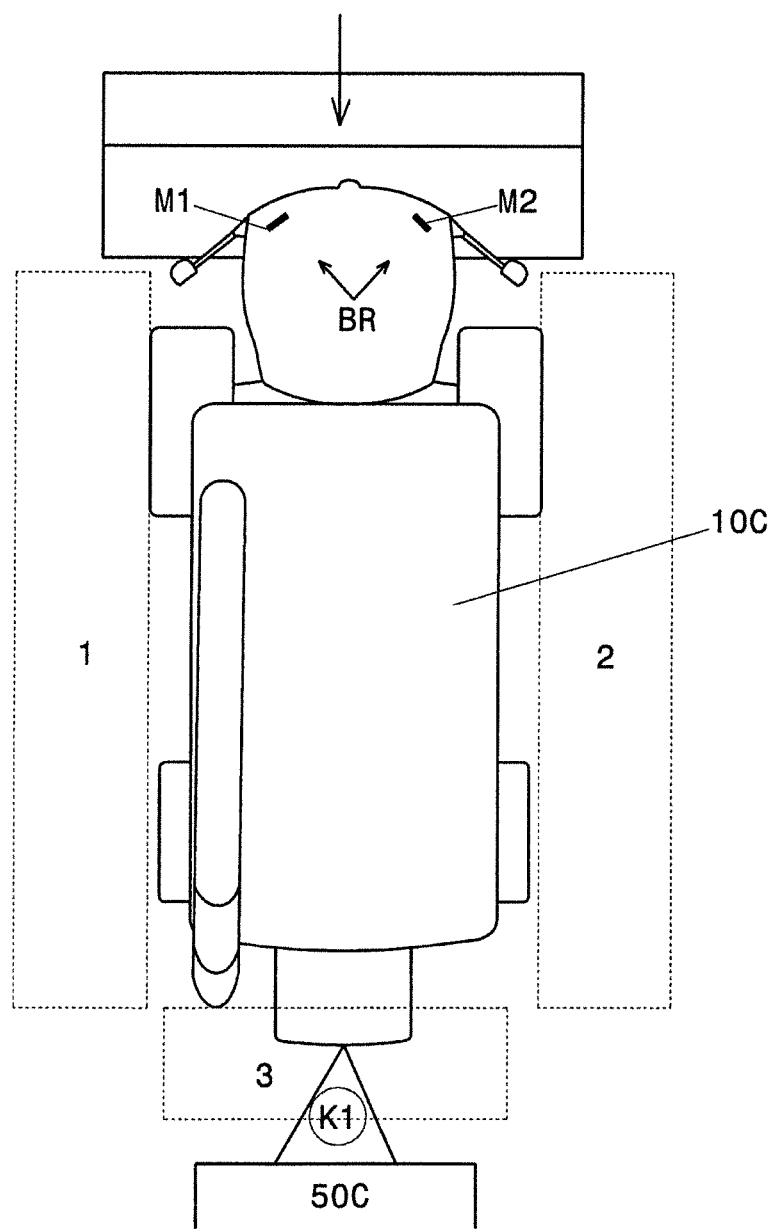
FIG. 9b shows a schematic plan view of a commercial vehicle around which the areas of view and collision areas, which are shown in FIG. 9a, are arranged there around.

FIG. 9a shows a schematic view of two reproduction units 40A, 40B with near areas 1, 2, 3 with fields of view and areas of view, respectively, and a collision area K1 depicted thereon according to a sixth embodiment. In FIG. 9b, the arrangement of near areas 1, 2, 3 and the collision area K1 around the vehicle associated to FIG. 9a is to be seen. As in FIG. 8b, also in FIG. 9b, a commercial vehicle 10C with an attachment arranged in the forward direction in front of the commercial vehicle, such as a snow bucking plate, is shown in a plane view. As the vehicles shown in the other embodiments, the commercial vehicle 10C shown in FIG. 9b has two monitors M1, M2 in the driver's cabin. As in the vehicle shown in FIG. 8a, in the commercial vehicle 10C shown in FIG. 9a, the near areas 1 and 2 run on the left and right, respectively, adjacent to the commercial vehicle 10C and extend from a rear edge of the commercial vehicle 10C in the longitudinal direction of the vehicle up to the height (position) of the outside rear view mirror. The additional near area 3 is located behind the vehicle and extends approximately over the entire width of the vehicle 10C.

The commercial 10C shown in FIG. 9b is going to drive straight rearward (see arrow in the upper part of FIG. 9b). Behind the commercial vehicle 10C, an obstacle 50C with which the commercial vehicle 10C may collide when driving rearward is located. Thus, a collision area K1 is located behind the commercial vehicle 10C. Specifically, the collision area K1 corresponds to a partial portion and partial section, respectively, of the near area 3. In FIG. 9b, the collision area K1 is depicted as circular plane. In order to monitor the collision area K1 during the planed driving maneuver, namely the rearward driving, the driver mainly views into the left outside rear view mirror and, in case of a mirror replacement system, into the left monitor M1 which shows the image of an image capture unit (not shown) mounted on the left outside during such a driving maneuver. Thus, the viewing direction BR of the driver runs to the left front in FIG. 9b (see arrow BR in the driver's cabin). However, it is also common during such a driving maneuver that the driver views into the monitor M2 on the right in the driver's cabin from time to time. Occasionally, the monitoring of the two monitors M1, M2 may even occur alternately.

Thus, the collision area K1, as shown in FIG. 8a, is shown to the driver both on the left monitor M1 and on the right monitor M2 due to the expected viewing direction (see arrow BR to the left and right front in FIG. 9b), in order to allow the driver a quick overview over the collision area K1 under ergonomical view points, as also shown in the embodiments in FIGS. 4a, 5a, 6a, 7a and 8a. In the example shown in FIG. 9a, the near area 3 is shown together with the collision area K1 in each of the lower parts of the monitors M1, M2, whereas the near area 1 is shown on the upper part of the left monitor M1 and the near area 2 is shown on the upper part of the right monitor M2.

In general, in view of the above explanations, it can be summarized that the at least one collision area preferably is shown together with a near area from which it has been taken as partial portion. Alternatively, however, it is also possible, to show a near area together with a collision area which has not been taken from the shown near area, but has been taken from another near area. Further, it is summarized that the reproduction of at least one near area and at least one collision area preferably occurs on the reproduction unit which is monitored commonly by the driver depending on the respective driving maneuver. If no reproduction unit can be detected which is viewed exclusively or more often by the driver during a driving maneuver, a reproduction of at least one near area and at least one collision area may also be performed on all existing reproduction units. The collision area corresponds to a partial portion and an image section, respectively, of a near area captured around the vehicle. Thus, the collision area may be shown in more detail and, thus, better viewable for the driver. The selection of the collision area is performed by the control unit based on various signals, such as based on manual inputs by the driver, such as operating the turning indicator, breaking/accelerating, etc., automatic positioning capturing by a positioning system, monitoring sensors, such as radar sensors, or signals of the capture units.

It is explicitly stated that all features disclosed in the description and/or the claims are intended to be disclosed separately and independently from each other for the purpose of original disclose as well as for the purpose of restricting the claimed invention independent on the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A viewing system for a vehicle, comprising:
   at least one capture unit which is adapted to capture at least one first near area around the vehicle;
   at least one control unit which is adapted to process the data captured by the capture unit; and
   at least one reproduction unit which is adapted to show the near area visibly for a driver steering the vehicle,
   wherein, in driving maneuvers conditioned by the situation, at least one collision area which comprises an area at risk of collision around the vehicle is additionally shown on the reproduction unit,
   wherein the collision area corresponds to an image section of a near area around the vehicle captured by the capture unit, and
   wherein a plurality of collision areas are shown at the same time on the at least one reproduction unit, and
   wherein the view system further comprises a sensor unit which detects a driving maneuver conditioned by the situation by receiving a corresponding input signal and determines the corresponding collision areas based on the input signal.

2. The viewing system according to claim 1, wherein the first near area comprises at least a part of legally prescribed field of view.

3. The viewing system according to claim 1, wherein the reproduction unit is adapted to show the first near area permanently and in real time.

4. The viewing system according to claim 1, wherein the reproduction unit is adapted to show the collision area by means of scaling.

5. The viewing system according to claim 1, wherein the first near area and the collision area are shown on a common reproduction unit.

6. The viewing system according to claim 5, wherein the collision area is shown on the common reproduction unit by means of superimposition.

7. The viewing system according to claim 5, wherein the collision area is shown on the common reproduction unit by means of overlaying.

8. The viewing system according to claim 1, wherein the input signal is generated by a manual input of the driver and/or a movement of the driver.

9. The viewing system according to claim 1, wherein the input signal is generated by capturing the position of the vehicle.

10. The viewing system according to claim 1, wherein the input signal is generated by monitoring the environment around the vehicle.

11. The viewing system according to claim 8, wherein the monitoring around the vehicle is performed by the at least one capture unit and/or an additional monitoring unit.

12. The viewing system according to claim 1, comprising at least two reproduction units, wherein at least the collision area is shown on that one of the at least two reproduction units which is viewed by the driver depending on the driving maneuver conditioned by the situation.

13. The viewing system according to claim 1, further comprising at least one further reproduction unit, wherein the near area and the collision area are shown separately on the at least one reproduction unit and the at least one further reproduction unit.

14. The viewing system according to claim 1, further comprising at least one second capture unit which is adapted to capture at least a second near area around the vehicle.

15. The viewing system according to claim 13, wherein the first near area and the second near area are adjacent to each other.

16. The viewing system according to claim 13, wherein the first near area and the second near area are not adjacent to each other.

17. The viewing system according to claim 1, wherein the collision area corresponds to a part of the first near area.

18. The viewing system according to claim 13, wherein the collision area corresponds to a part of the second near area.

19. The viewing system according to claim 13, wherein the collision area and the first near area or the second near area are adjacent to each other.

* * * * *